US012768574B2

(12) United States Patent
Nord

(10) Patent No.: US 12,768,574 B2
(45) Date of Patent: Oct. 20, 2026

(54) STIRLING ENGINE WITH NEAR ISOTHERMAL WORKING SPACES

(71) Applicant: Jonathan Nord, Jasper, IN (US)

(72) Inventor: Jonathan Nord, Jasper, IN (US)

( * ) Notice: Subject to any disclaimer, the term of this patent is extended or adjusted under 35 U.S.C. 154(b) by 0 days.

(21) Appl. No.: 18/565,287

(22) PCT Filed: May 31, 2022

(86) PCT No.: PCT/US2022/031554
§ 371 (c)(1),
(2) Date: Nov. 29, 2023

(87) PCT Pub. No.: WO2022/256302
PCT Pub. Date: Dec. 8, 2022

(65) Prior Publication Data

US 2024/0271835 A1 Aug. 15, 2024

Related U.S. Application Data

(60) Provisional application No. 63/196,463, filed on Jun. 3, 2021.

(51) Int. Cl.
*F25B 9/14* (2006.01)
*F02G 1/043* (2006.01)
*F02G 1/055* (2006.01)

(52) U.S. Cl.
CPC .............. *F25B 9/14* (2013.01); *F02G 1/0435* (2013.01); *F02G 1/055* (2013.01); *F02G 2270/40* (2013.01); *F02G 2280/10* (2013.01)

(58) Field of Classification Search
None
See application file for complete search history.

(56) References Cited

U.S. PATENT DOCUMENTS 3,583,155 A * 6/1971 Schuman .............. F02G 1/0435 60/520
3,899,888 A * 8/1975 Schuman .............. F02G 1/0435 60/519
4,169,434 A 10/1979 Guenther
4,353,683 A * 10/1982 Clark .................... F02G 1/0435 60/517
4,446,698 A * 5/1984 Benson ................. F02G 1/0435 60/520
4,774,808 A 10/1988 Otters
(Continued)

FOREIGN PATENT DOCUMENTS

CH 635166 A5 * 3/1983 ............... F02G 1/00
CN 2013102720996 A 10/2013
(Continued)

*Primary Examiner* — Wesley G Harris
(74) *Attorney, Agent, or Firm* — Jenei LLC

(57) ABSTRACT

A single-acting (two pistons) or double-acting (four pistons) alpha configuration Stirling engine has increased thermal exchange between a hot piston crown and a hot head and between a cold piston crown and a cold head of each piston cylinder assembly, increasing conversion of thermal energy to mechanical motion. The thermal exchange is provided by presenting corresponding transverse peaks and valley that create increased surface area and increased convective fluid flow rate for a working gas sealed in the Stirling engine.

7 Claims, 12 Drawing Sheets

(56) References Cited

U.S. PATENT DOCUMENTS

| | | | | |
|---|---|---|---|---|
| 5,002,020 | A * | 3/1991 | Kos | B60L 15/20 123/3 |
| 6,381,958 | B1 | 5/2002 | Kamen et al. | |
| 6,966,182 | B2 | 11/2005 | Kamen et al. | |
| 9,097,206 | B2 | 8/2015 | Akazawa et al. | |
| 9,689,344 | B1 * | 6/2017 | Gedeon | F02G 1/044 |
| 10,087,883 | B2 | 10/2018 | Holsapple | |
| 10,167,812 | B2 | 1/2019 | Xiao et al. | |
| 10,774,784 | B2 | 9/2020 | Paccoud et al. | |
| 10,787,992 | B1 | 9/2020 | Chen et al. | |
| 2002/0162316 | A1 | 11/2002 | Conde et al. | |
| 2012/0151912 | A1 | 6/2012 | Yamashita et al. | |
| 2012/0318486 | A1 | 12/2012 | Yaguchi et al. | |
| 2013/0047602 | A1 | 2/2013 | Katayama et al. | |
| 2014/0230428 | A1 | 8/2014 | Komori et al. | |
| 2015/0311775 | A1 | 10/2015 | Singh | |
| 2015/0315997 | A1 | 11/2015 | Song | |
| 2018/0023508 | A1 | 1/2018 | Javaherpour | |
| 2018/0291836 | A1 | 10/2018 | Langenfeld et al. | |
| 2020/0149494 | A1 | 5/2020 | Brown | |
| 2021/0003094 | A1 | 1/2021 | Mastonstr | |
| 2021/0054808 | A1 | 2/2021 | Mastonstr | |

FOREIGN PATENT DOCUMENTS

| | | | | |
|---|---|---|---|---|
| DE | 10319806 | A1 | 4/2005 | |
| DE | 102013104581 | A1 * | 11/2014 | F02G 1/055 |
| DE | 112013005282 | T5 * | 8/2015 | F02B 19/04 |
| WO | WO-2011033243 | A1 * | 3/2011 | F02G 1/057 |
| WO | WO-2017164762 | A1 * | 9/2017 | F02G 1/04 |

* cited by examiner

138

STIRLING ENGINE WITH NEAR ISOTHERMAL WORKING SPACES

CROSS-REFERENCE TO RELATED APPLICATIONS

This application is a National Stage application filed under 35 U.S.C. § 371 of International Application No. PCT/US22/31554, entitled "STIRLING ENGINE WITH NEAR ISOTHERMAL WORKING SPACES" and filed on May 31, 2022, which claims the benefit of priority under 35 U.S.C. § 119 (e) to U.S. Provisional Application Ser. No. 63/196,463, entitled "STIRLING ENGINE WITH NEAR ISOTHERMAL WORKING SPACES" filed Jun. 3, 2021, the contents of which are incorporated herein by reference in their entirety to form part of the present disclosure.

FIELD OF THE INVENTION

The present disclosure generally relates to Stirling cycle engines, and more particularly with alpha configuration Stirling cycle engines.

BACKGROUND

A Stirling cycle engine ("Stirling engine") is a heat engine that is operated by the cyclic compression and expansion of air or other gas (the working fluid) at different temperatures, resulting in a net conversion of heat energy to mechanical work. More specifically, the Stirling engine is a closed-cycle regenerative heat engine with a permanent gaseous working fluid. Closed-cycle, in this context, means a thermodynamic system in which the working fluid is permanently contained within the system, and regenerative describes the use of a specific type of internal heat exchanger and thermal store, known as the regenerator.

Basic models of Stirling engine are Alpha, Beta And Gamma. Common double acting Stirling engines are comprised of four cylinders and are known as Siemens or Rinia Stirling engines. Due to higher mechanical efficiency in Stirling cycle, the double acting Stirling engines are better in performance compared to single acting Stirling engines.

The efficiency of the Stirling engine is significantly affected by the amount of mechanical work required during each compression phase and the amount of mechanical work which is provided by the expansion phase. During compression, the gas in the compression space will increase in pressure. However, the gas will also increase in temperature due to gas behavior per Boyle's, Charles and Gay-Lussac Gas Laws. Due to the increased temperature, the pressure increases more than if the temperature had not increased. Therefore, more input mechanical work is required during compression. The design of present technology compression space piston and head provide very little heat transfer capability. Therefore, although the metal compression space components are near the low temperature desired for the compression process, very little heat is absorbed by these components during each compression phase.

Similarly, during expansion, the gas in the expansion space will decrease in pressure. However, the gas will also decrease in temperature due to gas behavior per Boyle's, Charles and Gay-Lussac Gas Laws. Due to the decreased temperature, the pressure decreases more than if the temperature had not decreased. Therefore, less output mechanical work is harnessed during expansion. The design of present technology expansion space piston and head provide very little heat transfer capability. Therefore, although the metal expansion space components are near the high temperature desired for the expansion process, very little heat is supplied by these components during each expansion phase.

The principle of operation of a Stirling cycle machine or Stirling engine is further discussed in detail in U.S. Pat. No. 6,381,958, issued May 7, 2002, to Kamen et al., which is herein incorporated by reference in its entirety.

BRIEF SUMMARY OF THE INVENTION

In one aspect, a piston cylinder assembly includes a cylinder comprising an internal bore. The piston cylinder assembly includes a first head that caps a first end of the internal bore and that includes one or more through holes. The piston cylinder assembly includes a piston received for longitudinal movement in the internal bore. The piston includes a first piston crown on a first longitudinal end of the piston facing an internal surface of the first head. The piston cylinder assembly includes a working fluid received in the internal bore between the first piston crown and the first head on each longitudinal side of the piston. The work fluid passes between at least one valley and at least one peak that align respectively between one and another the inner surface of the first head and the first piston crown. The working fluid passes out of the internal bore through the one or more through holes in the first head. The at least one valley and the at least one peak increase a surface area of the first head and the first piston crown to increase thermal exchange with the working fluid.

In one aspect, the present disclosure provides a piston cylinder assembly including a cylinder comprising an internal bore containing a working fluid. In another aspect, the piston cylinder assembly includes a hot head that caps a first end of the internal bore and that inwardly presents more than one transverse valley that communicates respectively with at least one through hole. Adjacent transverse valleys are separated by a transverse peak. The at least one through hole in the hot head is communicatively connectable via a first fluid path to at least one through hole in a cold head of a second piston cylinder assembly. The piston cylinder assembly includes a cold head that caps a second end of the internal bore opposite to the first end and that inwardly presents more than one transverse valley that communicates respectively with at least one through hole, Adjacent transverse valleys are separated by a transverse peak. The at least one through hole in the cold head is communicatively connectable via a second fluid path to at least one through hole in a hot head of a third piston cylinder assembly. In another aspect, the piston cylinder assembly includes a piston received for longitudinal movement in the internal bore of the cylinder. In another aspect, the piston includes a hot piston crown on one longitudinal end facing the hot head. the hot piston crown presents more than one transverse peak registered to correspond to the more than one transverse valley of the hot head. Adjacent ones of the more than one transverse peak of the hot piston crown are separated by a respective transverse valley. In another aspect, the piston includes a cold piston crown on another longitudinal end facing the cold head. In another aspect, the cold piston crown presents more than one transverse peak registered to correspond to the more than one transverse valley of the cold head. Adjacent ones of the more than one transverse peak of the hot piston crown are separated by a respective transverse valley. The increased surface area presented by the peaks and the valleys increases thermal exchange respectively between the hot piston crown and the hot head and between the cold piston crown and the cold head at the corresponding end of a longitudinal stroke of the piston.

In another aspect, the present disclosure provides a heat engine, which includes first, second, third, and fourth piston cylinder assemblies. In another aspect, each cylinder assembly in the engine is configured with both hot and cold working spaces. In another aspect, each piston cylinder assembly includes a cylinder comprising an internal bore containing a working fluid. Each piston cylinder assembly includes a hot head that caps a first end of the internal bore and that inwardly presents more than one transverse valley that communicates respectively with at least one through hole. Adjacent transverse valleys are separated by a transverse peak. Each piston cylinder assembly includes a cold head that caps a second end of the internal bore opposite to the first end and that inwardly presents more than one transverse valley that communicates respectively with at least one through hole. Adjacent transverse valleys are separated by a transverse peak. Each piston cylinder assembly includes a piston received for longitudinal movement in the internal bore of the cylinder. Each piston includes a hot piston crown on one longitudinal end facing the hot head and presenting more than one transverse peak registered to correspond to the more than one transverse valley of the hot head. Adjacent ones of the more than one transverse peak of the hot piston crown are separated by a respective transverse valley. Each piston includes a cold piston crown on another longitudinal end facing the cold head and presenting more than one transverse peak registered to correspond to the more than one transverse valley of the cold head. Adjacent ones of the more than one transverse peak of the hot piston crown are separated by a respective transverse valley. Each piston cylinder assembly includes a first fluid flow path communicatively coupled between the at least one through hole in the hot head of the first piston cylinder assembly and the at least one through hole in the cold head of the second piston cylinder assembly. Each piston cylinder assembly includes a second fluid flow path communicatively coupled between the at least one through hole in the hot head of the second piston cylinder assembly and the at least one through hole in the cold head of the third piston cylinder assembly. Each piston cylinder assembly includes a third fluid flow path communicatively coupled between the at least one through hole in the hot head of the third piston cylinder assembly and the at least one through hole in the cold head of the fourth piston cylinder assembly. Each piston cylinder assembly includes a fourth fluid flow path communicatively coupled between the at least one through hole in the hot head of the fourth piston cylinder assembly and the at least one through hole in the cold head of the first piston cylinder assembly. The increased surface area presented by the peaks and the valleys increasing thermal exchange respectively between the hot piston crown and the hot head and between the cold piston crown and the cold head at the corresponding end of a longitudinal stroke of the piston.

It is worth noting that double acting alpha Stirling cycle engines can be configured with various numbers of double acting cylinders (e.g., 3, 4, 5, 6, 7, 8, 9, 10, 11, 12 or more) with paths to move fluid between working spaces with desired phase angle relationships for accomplishing the thermodynamic processes between each set of hot and cold working spaces.

Additionally, it is worth noting that the two stationary heads (hot and cold) do not need to be facing opposite directions. For instance, the cold end can be stepped at a larger diameter than the rest of the cylinder. For example, see FIG. 3 of U.S. Pat. No. 4,169,434, which is incorporated herein by reference for all purposes. In this way, the piston crown is on the stepped portion of the piston and the head is on the stepped portion of the bore. In another aspect, the present disclosure provides for implementing a crown and head with this increase in heat transfer surface area in a beta engine.

A still further embodiment of the invention relate to one or more embodiments of a heating element for heating an external combustion engine or machine comprising a burner element for heating the working fluid of the engine, a blower providing air or other gas for facilitating ignition and combustion in the burner, a preheater defining an incoming air passage and an exhaust passage separated by an exhaust manifold wall for heating incoming air from the hot exhaust expelled from the heating element, a fuel injector for supplying fuel to mix with the incoming air, an igniter to ignite the fuel/air mixture, a prechamber defining an inlet for receiving the fuel/air mixture and promoting ignition of the mixture, a combustion chamber disposed linearly below the prechamber for maintaining supporting a flame developed and ignited in the prechamber, an electronic control unit for controlling ignition and combustion operations of the burner, and wherein the combustion chamber is connected to the exhaust passage into which the exhausted combustion gases are pushed to heat the incoming air following combustion and heating of the engine or machine. These aspects of the invention are not meant to be exclusive and other features, aspects, and advantages of the present invention will be readily apparent to those of ordinary skill in the art when read in conjunction with the appended claims and accompanying drawings.

A conventional Stirling machine is a closed, reversible, thermodynamic cycle which can be implemented as a prime mover or as a cooler. For engines, heat is supplied to the cycle to produce mechanical power, while for coolers, mechanical power is supplied and the output is cooling capacity. The ideal Stirling cycle includes the following three thermodynamic processes acting on the working fluid; 1) Isothermal Expansion—the expansion-space and associated heat exchanger are maintained at a constant high thermal temperature and the gas undergoes near-isothermal expansion absorbing heat from the hot source; 2) Constant-Volume (known as isovolumetric or isochoric) heat-removal, in which the gas is passed through the regenerator, where it cools, transferring thermal energy to the regenerator for use in the next cycle; and 3) Isothermal Compression—the compression space and associated heat exchanger are maintained at a constant low thermal temperature so the gas undergoes near-isothermal compression rejecting heat to the cold sink. The theoretical thermal efficiency equals that of the hypothetical Carnot cycle, i.e. the highest efficiency attainable by any heat engine. A Stirling machine needs a temperature differential to operate. In one or more embodiments, the heat is supplied by a heater. However, Stirling machines can operate by temperature differentials such as a cold source, such as ice, at the compression space cylinder and room temperature at the expansion space cylinder. Stirling engines have been shown to operate at temperature differentials of one degree Celsius.

In general, each Stirling machine, whether heat engine or cooler, has two working spaces. The hot side of the engine is maintained at high temperature by the solar concentrator and the cold side of the engine is exposed to the surroundings. The cold side of the cooler is attached to a storage tank and the hot side of the cooler is exposed to the surroundings. The temperature of the surroundings is lower than the hot side of the engine and higher than the cold side of the cooler.

The system has two separate working fluid circuits, one for the engine and another for the cooler. In an engine cycle, the working fluid transitions between the high-temperature $T_h$ maintained by the solar collector and the intermediate temperature $T_0$ of the surroundings. For the cooler, the working fluid operates between the intermediate temperature, $T_0$, of the surroundings and the lowest temperature of the storage tank at $T_1$. The fluid circulating inside the engine cycle may be of a different type or at a different average operational pressure than that running in the cooler.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

A single-acting (two pistons) or double-acting (four pistons) alpha configuration Stirling engine has increased thermal exchange between a hot piston crown and a hot head and between a cold piston crown and a cold head of each piston cylinder assembly, increasing conversion of thermal energy to mechanical motion. The thermal exchange is provided by presenting corresponding transverse peaks and valley that create increased surface area and increased convective fluid flow rate for a working gas sealed in the Stirling engine.

Figure 1:
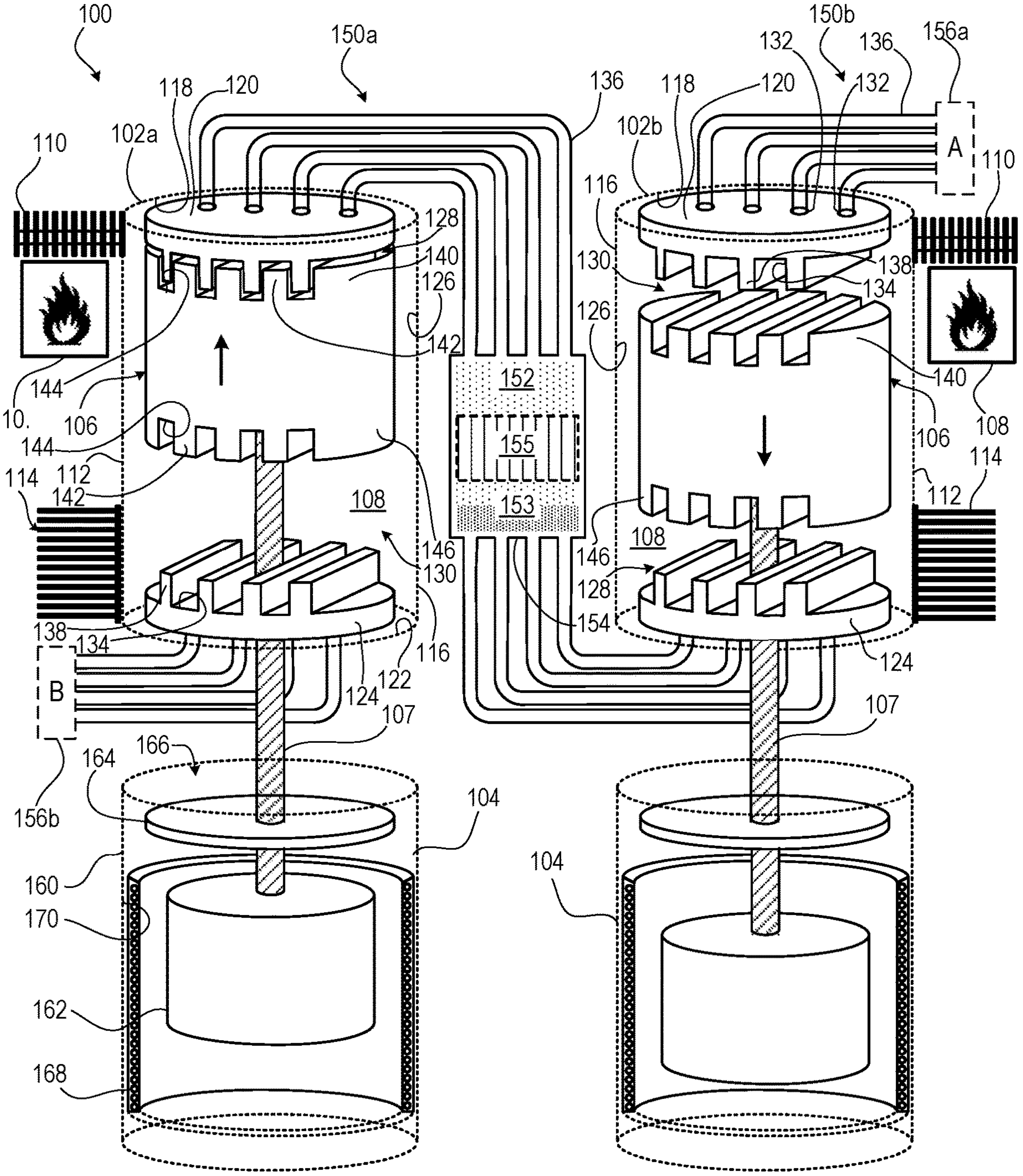
FIG. 1 depicts a functional diagram of an alpha configuration Stirling engine driving two linear inductive generators respectively by two free pistons with enhanced convective heat transfer to the working fluid, according to one or more embodiments.

FIG. 1 depicts a functional diagram of a heat engine, specifically an alpha configuration Stirling engine 100, having first and second piston cylinder assemblies 102*a*-102*b* driving two linear induction generators 104 respectively by pistons 106 via piston rods 107 with enhanced convective heat transfer to a working fluid 108. Examples of working fluid 108 include air, carbon dioxide, nitrogen, xenon, krypton, argon, helium and/or mixtures thereof. The first and second piston cylinder assemblies 102*a*-102*b* are configured respectively as a hot and a cold piston cylinder assembly but can be identical components. In one or more embodiments, pistons 106 can be freely moving as depicted in FIG. 1. In one or more embodiments, pistons 106 can be mechanically coupled such as via a crankshaft or wobble plate to combine mechanical motion and to enforce a relative motion delay. Each piston cylinder assemblies 102*a*-102*b* can have a thermal differential created in part by activating a heater 108 that heats an external heat exchanger 110 thermally coupled to a hot (upper) portion of a cylindrical enclosure 112 of each piston cylinder assemblies 102*a*-102*b*. A cooler 114 is thermally coupled to a cold (lower) portion of the cylindrical enclosure 112 to return thermal energy to the ambient environment. The thermal differential between top and bottom of each piston cylinder assemblies 102*a*-102*b* is also provided by fluid couplings between adjacent piston cylinder assemblies 102*a*-102*b* as described below. The cylindrical enclosure 112 includes a cylinder 116 having one end that is an upper hot circular opening 118, that is closed by a hot head 120 having one end that is an upper hot circular opening 118, that is closed by a hot head 120. and another end that is a lower cold circular opening 122, that is closed by a cold head 124. The cylinder 116 has a cylindrical bore 126 that receives a respective piston 106 for longitudinal movement, separating working fluid 108 into a compression space 128 that is in the direction of movement by the piston 106 and an expansion space 130 that is vacated by the piston 106.

In one or more embodiments, the cylinders and pistons may be machined from any one of the group consisting of aluminum, copper, chrome, iron alloys, cobalt-based superalloys, silicon carbide, and silicon nitride. Alloys of iron may be any one of nickel, chromium, cobalt, columbium, molybdenum, and tungsten. In another embodiment, the expansion and the compression spaces of the cylinders should be thermally conducting materials. It is known that both aluminum and copper have high coefficients of thermal conductivity. In a non-limiting example, the cylinders and pistons are made of copper. In another non-limiting example, the cylinders and pistons are made of aluminum.

In one or more embodiments, the contacting surfaces inside the cylinders and the outer surfaces of the pistons are highly polished to reduce drag. In another embodiment, the crankshaft and flywheel are manufactured by forging or casting ductile iron aluminum or aluminum alloys or tool steel. In one or more embodiments, each piston includes a piston ring. In another non-limiting example, the inner portion of the cylinder comprises a large bore in which the piston ring rides. In another non-limiting example, the pistons and cylinders are scaled with respect to the size of the Stirling engine. In a non-limiting example, a piston may have a height of one fourth the cylinder bore length.

In general, the pistons and the cylinders forming the working spaces and the regenerators are the basic mechanical components of a Stirling cycle machine. In one or more embodiments, the Stirling heat engine section and the Stirling cooler sections are each sealed so that substantial gas does not escape. In one or more embodiments, the regenerator is constructed of material that readily conducts heat and has a high surface area. When hot gas is transferred to the cool cylinder, it is first driven through the regenerator, where a portion of the heat is deposited. When the cool gas is transferred back, this heat is reclaimed; thus the regenerator "pre-heats" and "pre-cools" the working gas, dramatically improving efficiency.

In a non-limiting example, helium gas may be the working fluid in the engine and the cooler. The working fluid circulating in the engine side may be of a different type or at a different average operational pressure than that running in the cooler side. The working fluid may be selected from the group consisting of helium, hydrogen, air, ethanol, nitrogen, combinations of air and ethanol, fluorine compounds exemplified by sulfur hexafluoride, perfluorobutane, perfluoropropane, and octafluorocyclobutanenano-fluids; nano-fluids and combinations of air, ethanol and ZnO nanoparticles.

Through holes 132 in the hot and cold heads 120, 124 communicate between inward facing transverse valleys 134 within the bore 126 and gas pipes 136. The transverse valleys 134 are separated by transverse peaks 138. Each piston 106 includes a hot piston crown 140 facing a respective hot head 120 and that has complementary transverse peaks 142 separated by complementary transverse valleys 144 that interdigitate or mesh with the transverse valleys 134 and transverse peaks 138 of the hot head 120, providing an increased surface area and proximity for radiant and convective transfer of thermal energy between the working fluid 108, hot head 120, and hot piston crown 140. Similarly, each piston 106 includes a cold piston crown 146 facing a respective cold head 124 and that has complementary transverse peaks 142 separated by complementary transverse valleys 144 that interdigitate or mesh with the transverse valleys 134 and transverse peaks 138 of the cold head 124, providing an increased surface area and proximity for radiant and convective transfer of thermal energy between the working fluid 108, cold head 124, and cold piston crown 146.

In some implementations, transverse valleys and peaks other than the transverse valleys and peaks shown (for example in FIG. 6) can be used. For example, transverse valleys and peaks having a pin, block, spiral, or other shape could be used in place of the linear straight transverse valleys and peaks.

To operate as an engine, a Stirling engine needs to absorb heat, expand the gas, reject waste heat, and then compress or contract the gas. In one or more embodiments, a main component of a Stirling engine is a regenerator, which is placed between a hot and lower temperature spaces. A regenerator works by storing some of the heat that would otherwise have to be rejected to the environment in the regenerator until the working gas flow reverses and the heat can be used in the next cycle. The regenerator in a Stirling engine works as an internal heat exchanger, located between the hot and cold parts of the engine. The working fluid flows over it in both directions, storing heat from one cycle to be used in the next cycle. A regenerator is used to recycle the heat within the engine, as opposed to wasting the heat to the atmosphere. In general, this improves overall efficiency and power output.

In one or more embodiments, the regenerator transfers heat between a working fluid and a flow-channel wall of the regenerator. The fluid can be helium or another gas that has suitable thermodynamic properties and that does not react chemically with engine components. A typical regenerator is substantially cylindrical in overall shape and includes one or more axial passages containing a matrix, which is an open, thermally conductive structure with many flow paths and large surface area for transfer of heat to and from the working fluid. The regenerator has an insulated wall which enables heat storage in the matrix. During the passage of hot particles, heat is transferred from the hot fluid and is stored in the matrix of the regenerator. In the return path, this heat is regenerated and is transferred to the cold fluid passing through the regenerator.

There are many types of regenerators available. In one or more embodiments, the regenerators used in the present disclosure have low thermal conductance in the lateral (axial) direction and high thermal conductance in the traverse (radial) direction. Matrices in regenerators can be made of various components, including steel wool, steel felt, stacked screens, packed balls, metal foils, metallic meshes, metallic sponges, carbon fibers, perforated pyrolytic graphite stacks, open pore metal foams and parallel plates, and combinations of the foregoing. The matrix materials may be any of stainless steel, copper, bronze, aluminum and Monel 400, and combinations of the foregoing. In a non-limiting example, a regenerator used in the present disclosure may be a stainless-steel cylinder lined with steel wool. In a further non-limiting example, a regenerator may be constructed of a mesh of closely spaced, thin metal plates.

The first piston cylinder assembly 102*a* has a first fluid flow path 150*a* that provides fluid communication between through holes 132 in the hot head 120 and through holes 132 in the cold head 124 of the second piston cylinder assembly 102*b*. The first flow path 150*a* includes gas pipes 136 that connect each through hole 132 to respective hot and cold sides 152, 153 of a regenerator 154. The regenerator 154 is thus located in a passage provided by the gas pipes 136 between the two piston cylinder assemblies 102*a*-102*b* is not strictly necessary but serves to improve the efficiency of the Stirling engine 100. The regenerator 154 is typically a metal or ceramic matrix 155 with a large surface area capable of absorbing and giving up heat. The metal may be any metal or metal alloy suitable for use in a high temperature application as a heat exchanging material, such as a ferro chrome alloy or nickel steel. As the gas cycles from the first piston cylinder assembly 102*a* to the second piston cylinder assembly 102*b*, some of the heat in the working fluid 108 is transferred to the regenerator 154 thus helping to cool the working fluid 108. Subsequently, as the working fluid 108 cycles from the second piston cylinder assembly 102*b* to the first piston cylinder assembly 102*a*, some of the heat in the regenerator 154 is transferred to the working fluid 108, thus helping to warm the working fluid 108. The regenerator 154 reduces both the amount of heat which must be put into the working fluid 108 by the heater 108 and also the amount of waste heat which must be removed from the gas by the cooler 114. The regenerator 154 thus reduces the fuel consumption and improves the overall working cycle efficiency. The gas transfer passage provided by the first flow path 150*a* between the two cylinders is essentially dead space and should be kept as short as possible.

In the case of a Stirling engine used under a using environment where exhaust gas temperature is 500 C or lower, if the gas pipes/tubes are made of copper having high thermal conductivity, the heat exchanging efficiency can be enhanced. If the gas pipe is made of copper, the heating portion head is made of copper or stainless steel. In the case of a Stirling engine used under a using environment where exhaust gas temperature is about 500 C to 800 C, the gas pipe is made of stainless steel to secure strength. When the gas pipe is made of stainless steel, the heating portion head is made of stainless steel. When component of exhaust gas under the using environment contains corrosiveness component, gas pipe and a heating portion head made of copper or stainless steel are subjected to surface coating such as chromium-based surface coating, ceramic flame spraying (coating) or surface coating using Ni or carbon coating, thereby enhancing endurance. In the case of a Stirling engine used under a using environment where the exhaust gas temperature is 800 C or higher, e.g., under a using environment of corrosive exhaust gas such as chlorine-based corrosive exhaust gas or corrosive exhaust gas such as nitric acid or hydrofluoric acid, if the gas pipe is made of titanium or nickel-chromium alloy, reliability and endurance can be enhanced, and a weight of the engine can largely be reduced. Titanium has smaller density as compared with the stainless steel by about 40 to 50%, strength is high and density is smaller and thus, the member can be made thinner as compared with stainless steel, and this is especially suitable for a Stirling engine used in an incinerator and a glass smelting furnace. When the gas pipe is made of titanium, the heating portion head is made of stainless steel. In the case of titanium and nickel-chromium alloy, the heating portion head shows excellent welding properties by adjusting welding condition, and the gas pipe is inserted into a flue which configures the exhaust gas flow passage.

Engine performance, in terms of both power and efficiency, is highest at the highest possible temperature of the working gas in the expansion volume of the engine. The maximum working gas temperature, however, is typically limited by the properties of the heater head. For an external combustion engine with a tube heater head, the maximum temperature is limited by the metallurgical properties of the heater tubes. If the heater tubes become too hot, they may soften and fail resulting in engine shut down. Alternatively, at too high of a temperature the tubes will be severely oxidized and fail. It is, therefore, important to engine performance to control the temperature of the heater tubes. A temperature sensing device, such as a thermocouple, may be used to measure the temperature of the heater tubes. The temperature sensor mounting scheme may thermally bond the sensor to the heater tube and isolate the sensor from the much hotter combustion gases. The mounting scheme should be sufficiently robust to withstand the hot oxidizing environment of the combustion-gas and impinging flame that occur near the heater tubes for the life of the heater head. One set of mounting solutions include brazing or welding thermocouples directly to the heater tubes. The thermocouples would be mounted on the part of the heater tubes exposed to the hottest combustion gas. Other possible mounting schemes permit the replacement of the temperature sensor. In one embodiment, the temperature sensor is in a thermowell thermally bonded to the heater tube. In another embodiment, the mounting scheme is a mount, such as a sleeve, that mechanically holds the temperature sensor against the heater tube.

The through holes 132 in the cold head 124 of the first piston cylinder assembly 102*a* are in fluid communication with a hot head 120 of an adjacent piston cylinder assembly via another regenerator. The through holes 132 in the hot head 120 of the second piston cylinder assembly 102*b* are in fluid communication with a cold head 124 of an adjacent piston cylinder assembly via another regenerator. In a Stirling engine 100 that is single acting, a second flow path 150*b* is provided between blocks A-B 156*a*-156*b* that include a regenerator.

Each linear induction generator 104 includes a generator enclosure 160 that receives the piston rod 107 distally connected to a mover 162 for reciprocating longitudinal movement. A flexure spring 164 is positioned across an opening 166 in the generator enclosure 160 to resiliently center the piston rod 107. Stator coils 168 are positioned around an interior bore 170 of the generator enclosure 160 for having an inductive current induced by movement of the mover 162.

In operation as a single action alpha configuration, the Stirling engine 100 is operated by the cyclic compression and expansion of air or other gas (the working fluid 108) at different temperatures, resulting in a net conversion of heat energy to mechanical work. More specifically, the Stirling engine 100 is a closed-cycle regenerative heat engine with a permanent gaseous working fluid 108. Closed-cycle, in this context, means a thermodynamic system in which the working fluid 108 is permanently contained within the system, and regenerative describes the use of a specific type of internal heat exchanger and thermal store, known as the regenerator 154. A fixed amount of air, or other working fluid 108, is enclosed within the first and second piston cylinder assemblies 102*a*-102*b*, respectively hot and cold piston cylinder assemblies, and shuttles forwards and backwards between the two. The air is heated and expands in the first piston cylinder assembly 102*a* and is cooled in the second piston cylinder assembly 102*b* where the working gas 108 is compressed by input of mechanical work.

In a first portion of the cycle, the working fluid 108 (gas) is heated and expands pushing the piston 106 in the first piston cylinder assembly 102*a* to the bottom of the cylinder 116, actuating the piston rod 107 to accomplish work. Expansion continues causing the working gas 108 to flow towards the second piston cylinder assembly 102*b* via the first fluid flow path 150*a*. The piston 106 in the second piston cylinder assembly 102*b*, which is about 90 degrees (a quarter revolution) behind the piston 106 in the first piston cylinder assembly 102*a* in its cycle, is also pushed downwards extracting more work from the hot working fluid 108. In a second portion of the cycle, the working gas 108 has reached is maximum volume and has stored momentum in the system such as in a flywheel or crankshaft. In one or more embodiments, an eccentric disc, sometimes called a cam, can be used in place of a flywheel to increase the compression ratio of the engine. In one or more embodiments, the compression ratio can be increased because the shape of the cam can be adjusted to maximize the ratio of the maximum volume of the working gas to the minimum volume of the working gas. In one or more embodiments, higher compression ratios result in higher engine efficiency.

With reference to a double acting alpha configuration Stirling engine 200 (FIG. 2), the four piston cylinder assemblies 102*a*-102*d* with each 90 degrees ahead and behind respectively of adjacent piston cylinder assemblies 102*a*-

102*d* can maintain production of work being accomplished continuously through each of the four phases. The momentum in the Stirling engine 100 or assistance from a different piston cylinder assembly now pushes the piston 106 in the first piston cylinder assembly 102*a* in a reverse direction, forcing most of the working fluid 108 in the second piston cylinder assembly 102*b* into the first piston cylinder assembly 102*a*. The working gas 108 in the second piston cylinder assembly 102*b* expands, cooling the second piston cylinder assembly 102*b*. In a third portion of the cycle, as the piston 106 in the first piston cylinder assembly 102*a* reaches the top of its stroke, almost all the gas has now transferred to the second piston cylinder assembly 102*b* where cooling continues and the working fluid 108 contracts reducing the pressure even more. The reduced pressure allows the piston 106 to rise. The momentum in the Sterling engine 100 or working gas 108 from an adjacent piston cylinder assembly compresses the working fluid 108 in the second piston cylinder assembly 102*b* and forces the working fluid 108 back towards the first piston cylinder assembly 102*a*. In a fourth portion of the cycle, the working fluid 108 reaches its minimum volume and forced into the first piston cylinder assembly 102*a* where the working fluid starts to push the piston 106 in the first piston cylinder assembly 102*a* downwards. The working fluid 108 is heated once more in the first piston cylinder assembly 102*a* where the pressure increases and the working fluid 108 expands, pushing the piston 106 in the first piston cylinder assembly 102*a* downwards in its power stroke and the cycle starts again.

Figure 2:
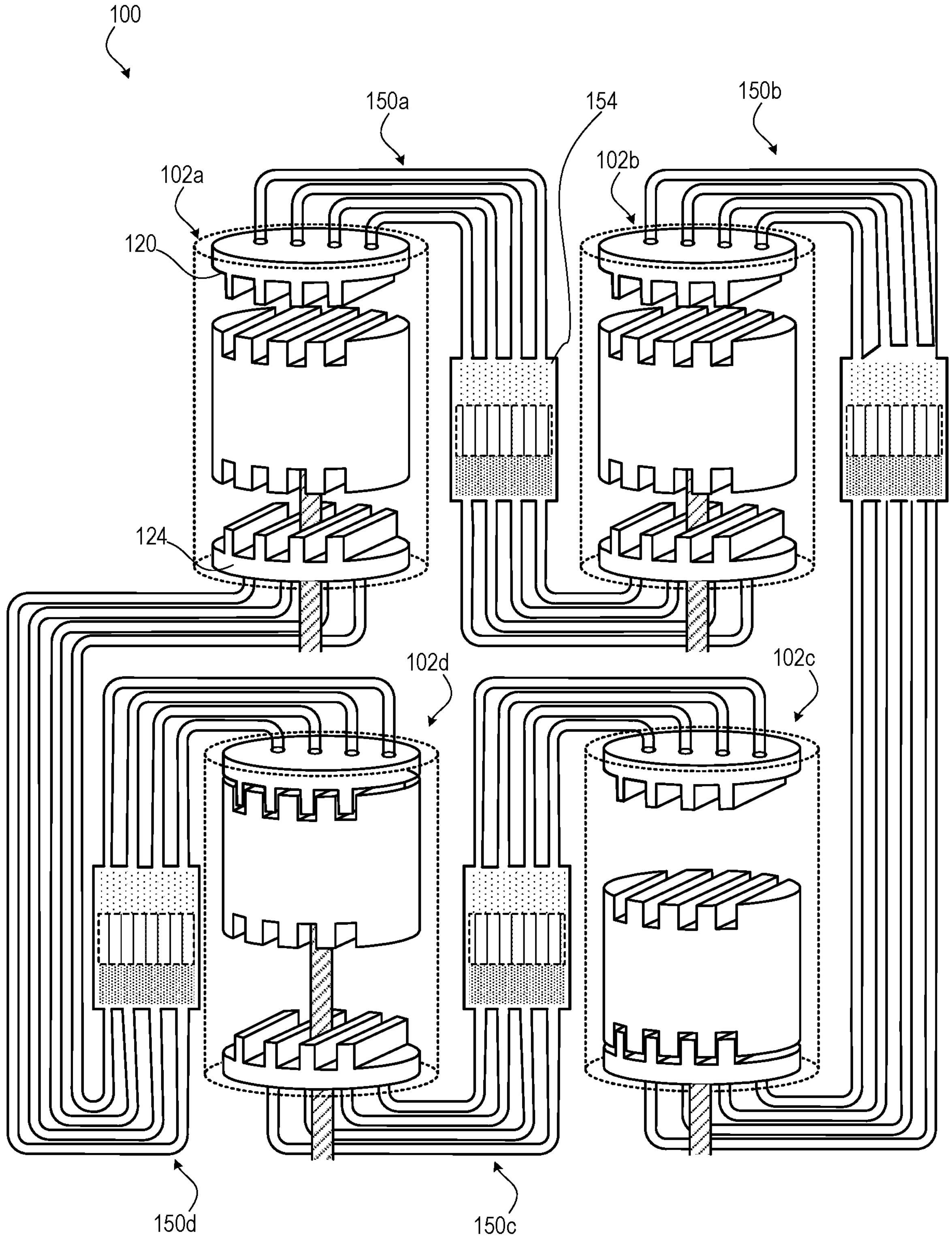
FIG. 2 depicts a functional diagram of a double-acting alpha configuration Stirling engine, according to one or more embodiments.

FIG. 2 depicts a functional diagram of a double-acting alpha configuration Stirling engine 100*a* that includes first, second, third, and fourth piston cylinder assemblies 102*a*-102*d* that are in fluid communication respectively by first, second, third and fourth fluid flow paths 150*a*-150*d*, each having a regenerator 154. First fluid flow path 150*a* provides fluid communication between through holes 132 in the hot head 120 of the first piston cylinder assembly 102*a* and a cold head 124 of the second piston cylinder assembly 102*b*. Second fluid flow path 150*b* provides fluid communication between through holes 132 in the hot head 120 of the second piston cylinder assembly 102*b* and a cold head 124 of the third piston cylinder assembly 102*c*. Third fluid flow path 150*c* provides fluid communication between through holes 132 in the hot head 120 of the third piston cylinder assembly 102*c* and a cold head 124 of the fourth piston cylinder assembly 102*d*. Fourth fluid flow path 150*d* provides fluid communication between through holes 132 in the hot head 120 of the fourth piston cylinder assembly 102*d* and a cold head 124 of the first piston cylinder assembly 102*a*.

Figure 3:
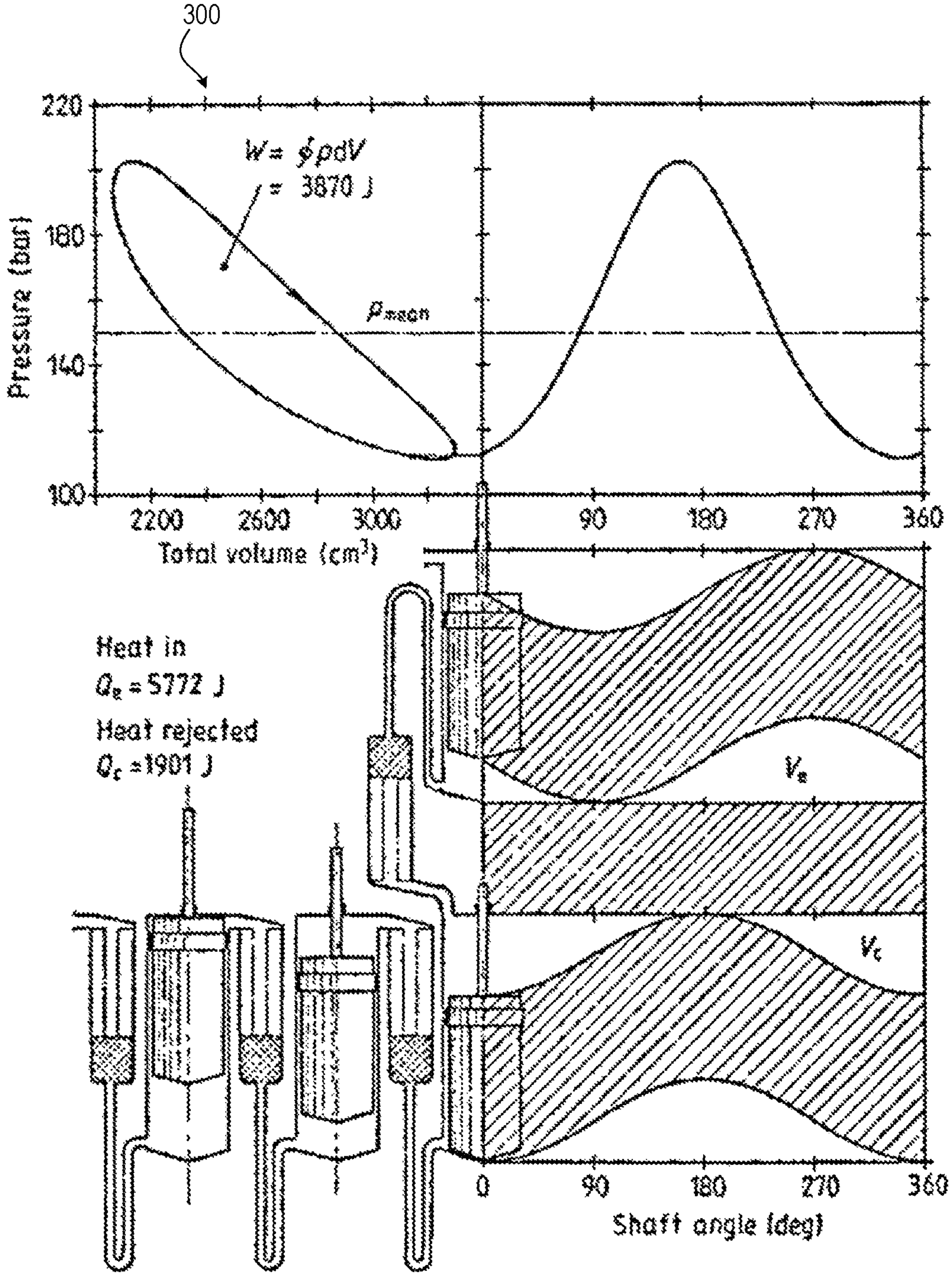
FIG. 3 depicts a graphical plot of pressure as a function of total volume based on respective shaft angles of two pistons of an alpha configuration Stirling engine, according to one or more embodiments.

FIG. 3 depicts a graphical plot 300 of pressure as a function of total volume based on respective shaft angles of two pistons of an alpha configuration Stirling engine. The Stirling engine is designed to produce mechanical work output by (generally) utilizing the following phases: (1) near isothermal (constant temperature) compression (mechanical work being input to the cycle); (2) near constant volume heating (heat energy being input into the cycle); (3) near isothermal expansion (mechanical work being output from the cycle); and (4) near constant volume cooling (heat energy being removed, and mostly stored for reuse). A heat engine approximating the Stirling cycle has been implemented in many different configurations over more than 200 years since its invention by Rev. Robert Stirling in 1816. Here in these depicted embodiments, the Stirling engine is presented in a configuration which has been referred to in the literature as the "double-acting alpha" configuration. This embodiment uses this arrangement in a four cylinder free piston configuration. In this configuration, the compression space of each cylinder is in communication with the heat exchange path (comprised of the cooler, regenerator, and heater) through which the working gas passes to and from the expansion space of the adjacent cylinder. The processes 1-4 above are achieved by moving these two pistons through an approximately sinusoidal motion with approximately 90 phasing between the two pistons:

Phase 1) Beginning at angle ~0. The compression space piston begins this phase at near maximum compression space volume and reduces in volume as the expansion space is near half volume and reduces to minimal volume. This phase results in compression of the working gas mostly within the compression space and ends at angle ~90 deg.

Phase 2) Beginning at angle ~90, the compression space is near half volume and reducing in volume as the expansion space is at minimal volume but is increasing to near half volume by the end of this phase at angle ~180 deg. This results in transfer of the working gas from the compression space through the heat exchange path to the expansion space. The working gas is heated during this transfer through the heat exchange path.

Phase 3) Beginning at angle ~180 deg, the expansion space volume increases rapidly as the compression volume begins to increase from its minimum volume. This phase results in expansion of the working gas mostly within the expansion space and ends at angle ~270 deg.

Phase 4) Beginning at angle ~270, the expansion space is at maximum volume but begins to decrease in volume as the compression space is near half volume and increasing in volume to near its maximum volume by the end of this phase at angle ~360 deg (0). This results in transfer of the working gas from the expansion space through the heat exchange path to the compression space. The working gas is cooled during this transfer through the heat exchange path.

Figure 4:
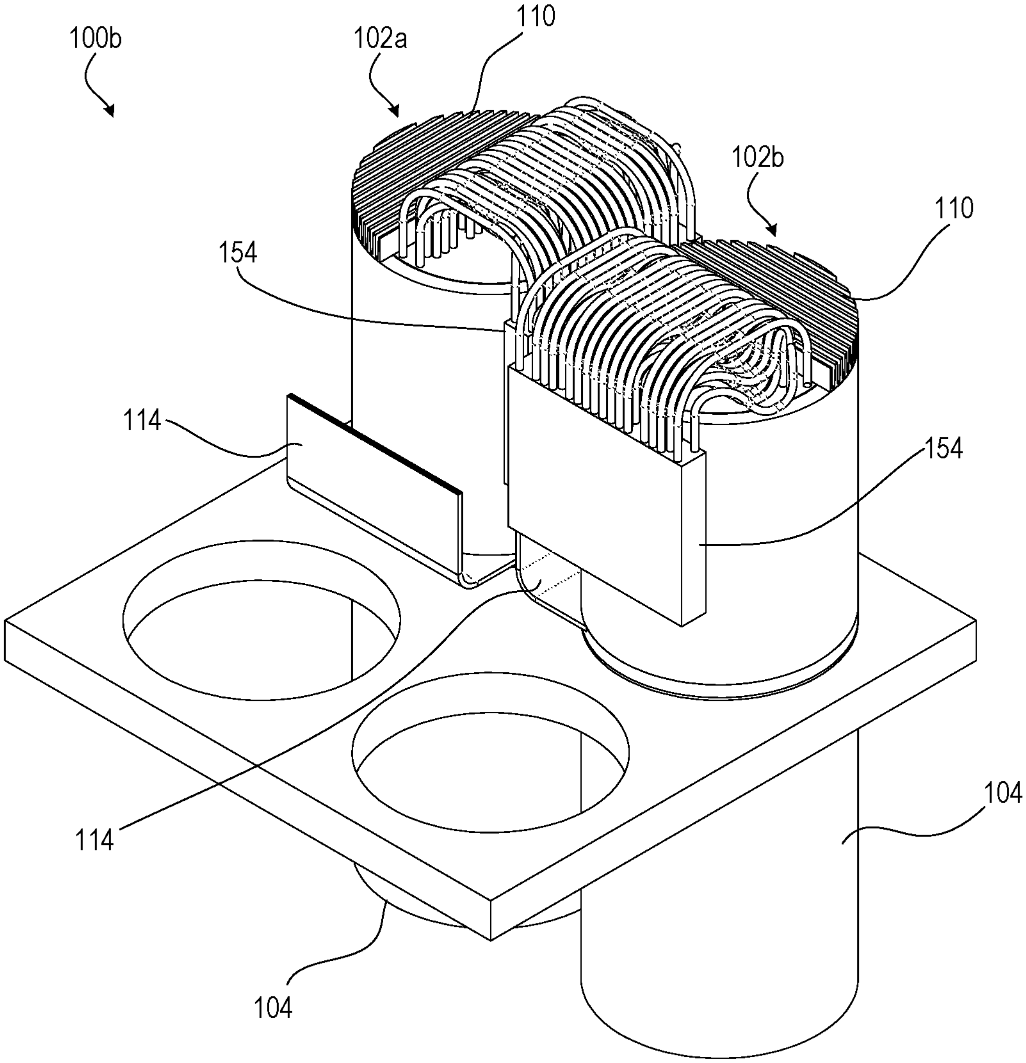
FIG. 4 depicts a three-dimensional top view of an example pair of hot and cold piston cylinder assemblies of an example four cylinder double acting free piston Stirling engine, according to one or more embodiments.

FIG. 4 depicts a three-dimensional top view of an example pair of hot and cold piston cylinder assemblies 102*a*-102*b* of an example four cylinder double acting free piston Stirling engine 100*b*. Each piston cylinder assembly 102*a*-102*b* includes an external heat exchanger 110 and cooler 114. Each piston cylinder assembly 102*a*-102*b* drives a respective linear induction generators 104.

Figure 5:
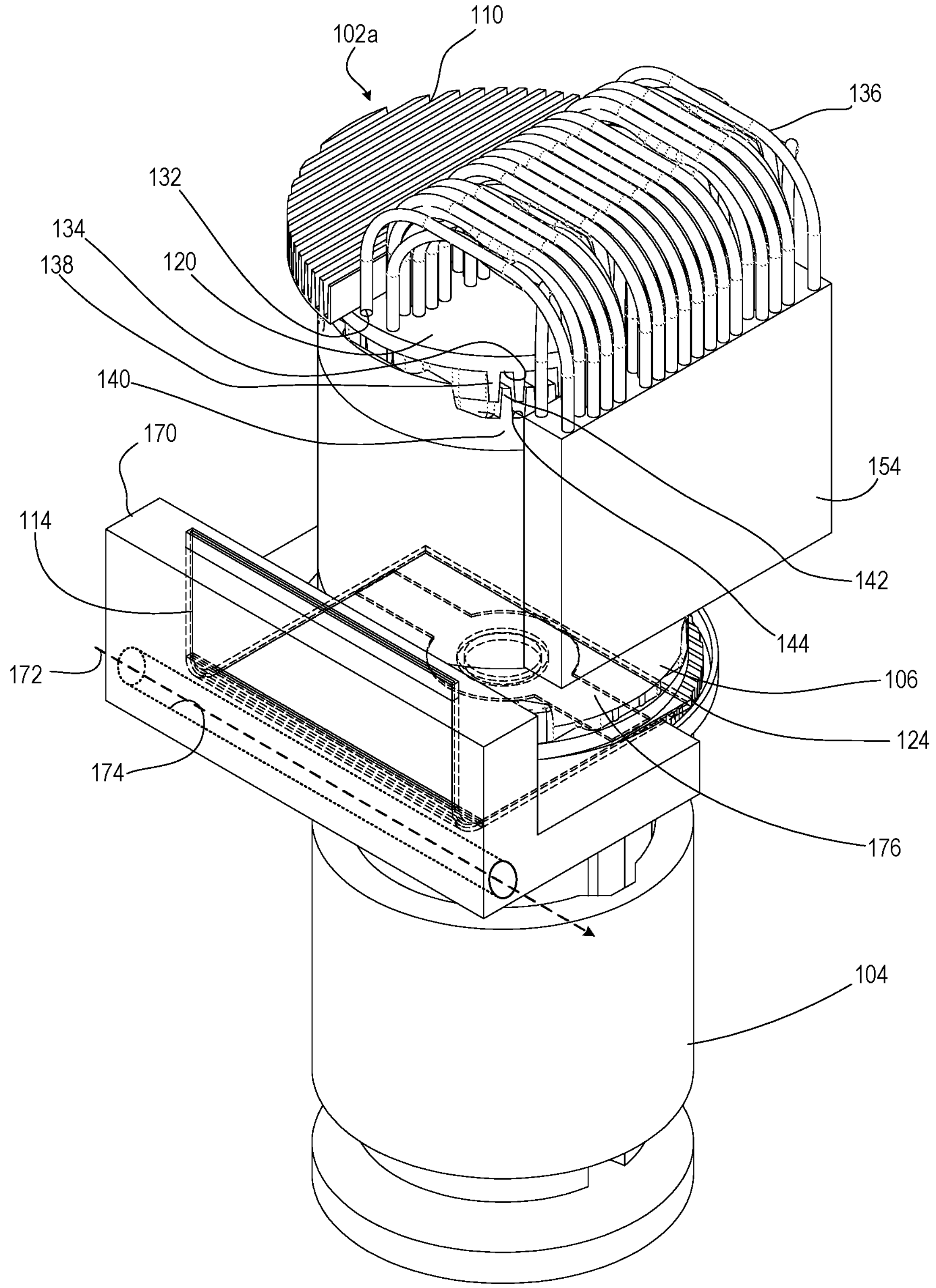
FIG. 5 depicts a three-dimensional top view of a single piston cylinder assembly of the example four cylinder double acting free piston Stirling engine of FIG. 4, according to one or more embodiments.

FIG. 5 depicts a three-dimensional top view of a single piston cylinder assembly 102*a* of the example four cylinder double acting free piston Stirling engine 100*b*. A coolant manifold 170 that is cooled by a coolant flow 172 through a coolant passage 174 is in thermal contact with the cooler 114 and includes a cross frame 176 that is thermal conductive contact to the cold head 124.

Figure 6:
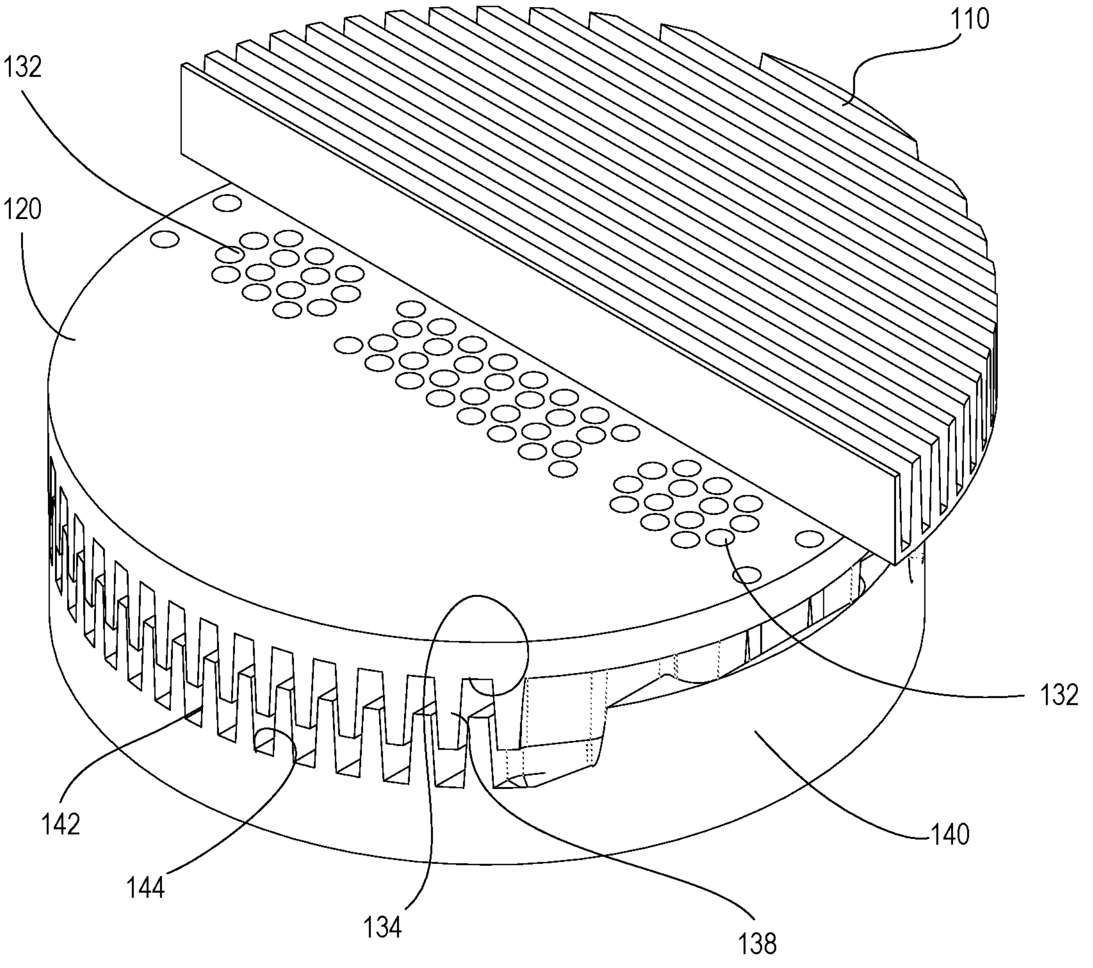
FIG. 6 depicts a three-dimensional top view of a hot piston crown in close thermal engagement with a heated upper portion of the single piston cylinder assembly of FIG. 4, according to one or more embodiments.

FIG. 6 depicts a three-dimensional top view of a hot piston crown 140 in close thermal engagement with a hot head 120 of an upper portion of the single piston cylinder assembly 102*a* that is heated by external heat exchanger 110. Hot head 120 includes through holes that communicate with transverse valleys 134 between transverse peaks 138. Hot piston crown 140 has complementary transverse peaks 142 flanked by complementary transverse valleys 144 that increase cross sectional area for thermal transfer with hot head 120.

Figure 7:
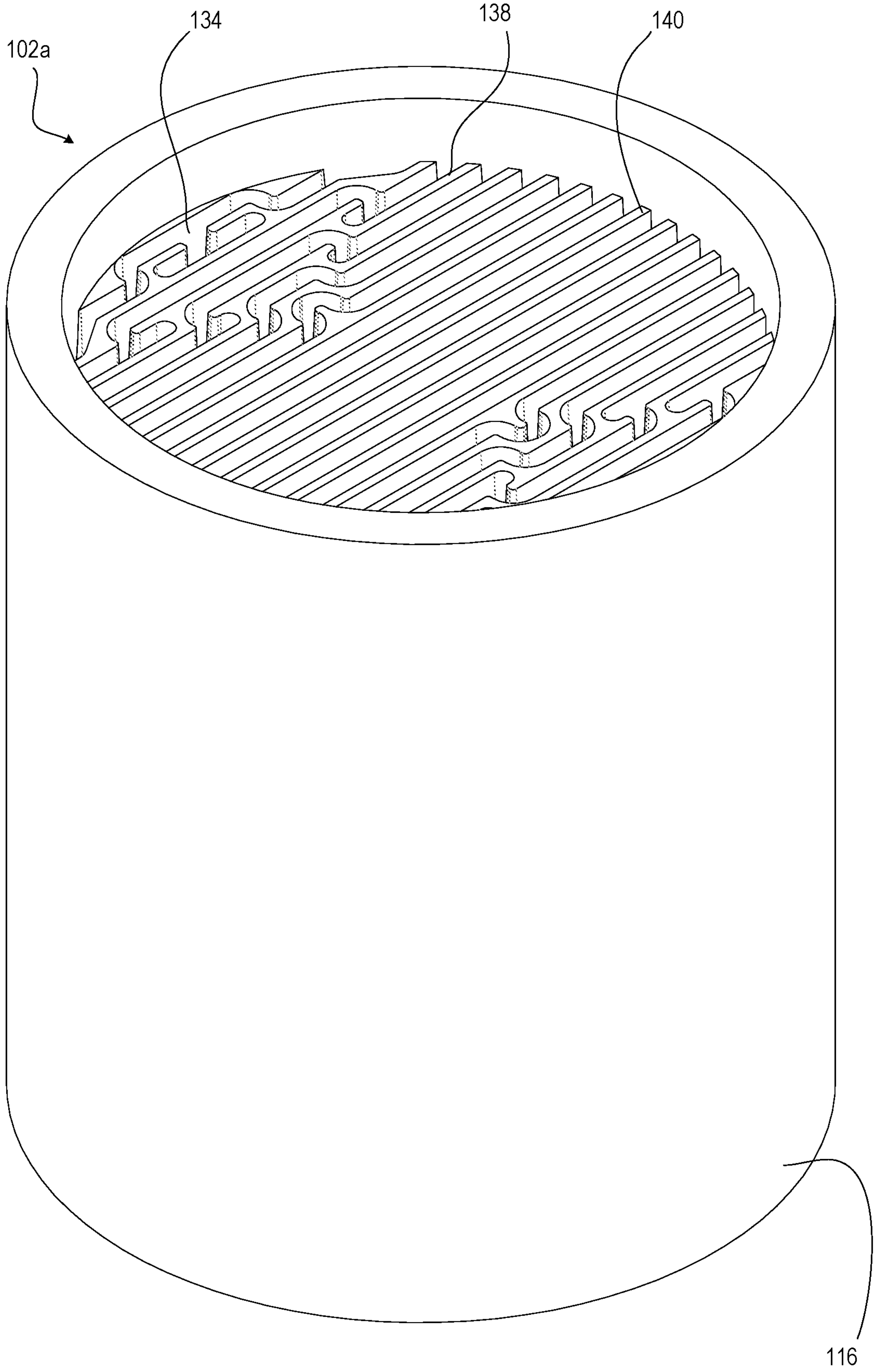
FIG. 7 depicts a three-dimensional top view of the cylindrical sidewall enclosure and the hot piston crown of the single piston cylinder assembly of FIG. 4, according to one or more embodiments.

FIG. 7 depicts a three-dimensional top view of the cylindrical 116 that receives the hot piston crown 140 of the single piston cylinder assembly 102*a*.

Figure 8:
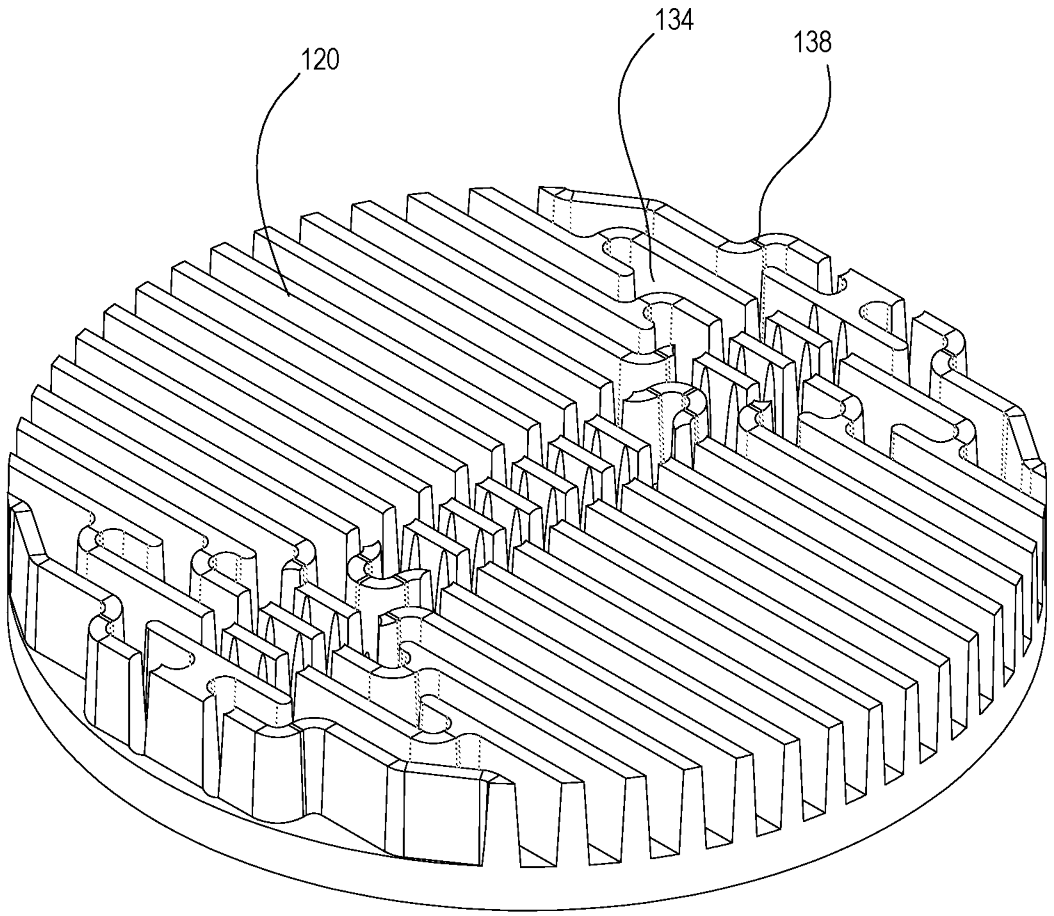
FIG. 8 depicts a three-dimensional top view of the hot head, according to one or more embodiments.

FIG. 8 depicts a three-dimensional top view of the hot head 120. Transverse valleys 134 and transverse peaks 138 on each lateral side of the hot head 120 have a more tortuous path to increase the flow path to approximate the flow path length more closely on the central transverse valleys 134.

Figure 9:
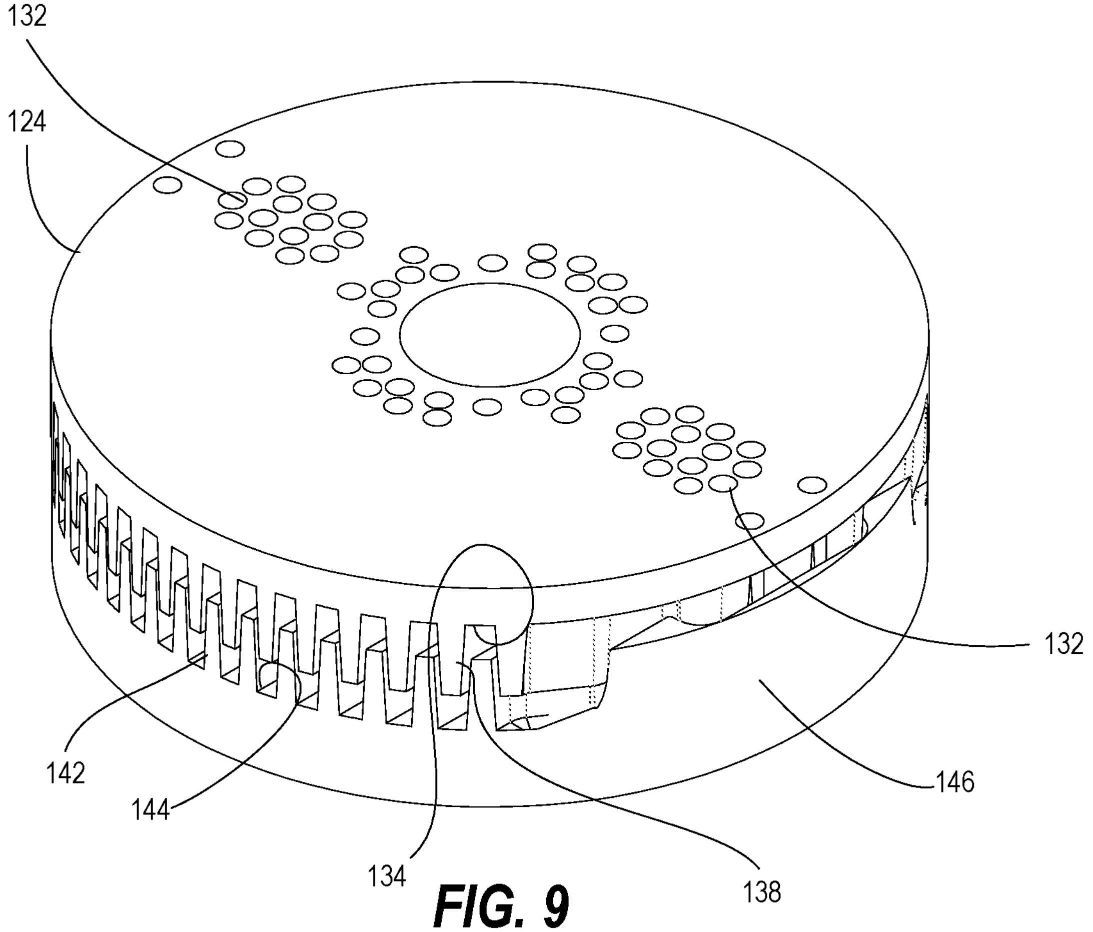
FIG. 9 depicts a three-dimensional bottom view of a cold piston crown in close thermal engagement with a cooled lower portion of the single piston cylinder assembly of FIG. 4, according to one or more embodiments.

FIG. 9 depicts a three-dimensional bottom view of a cold piston crown in close thermal engagement with a cooled lower portion of the single piston cylinder assembly of FIG. 4.

Figure 10:
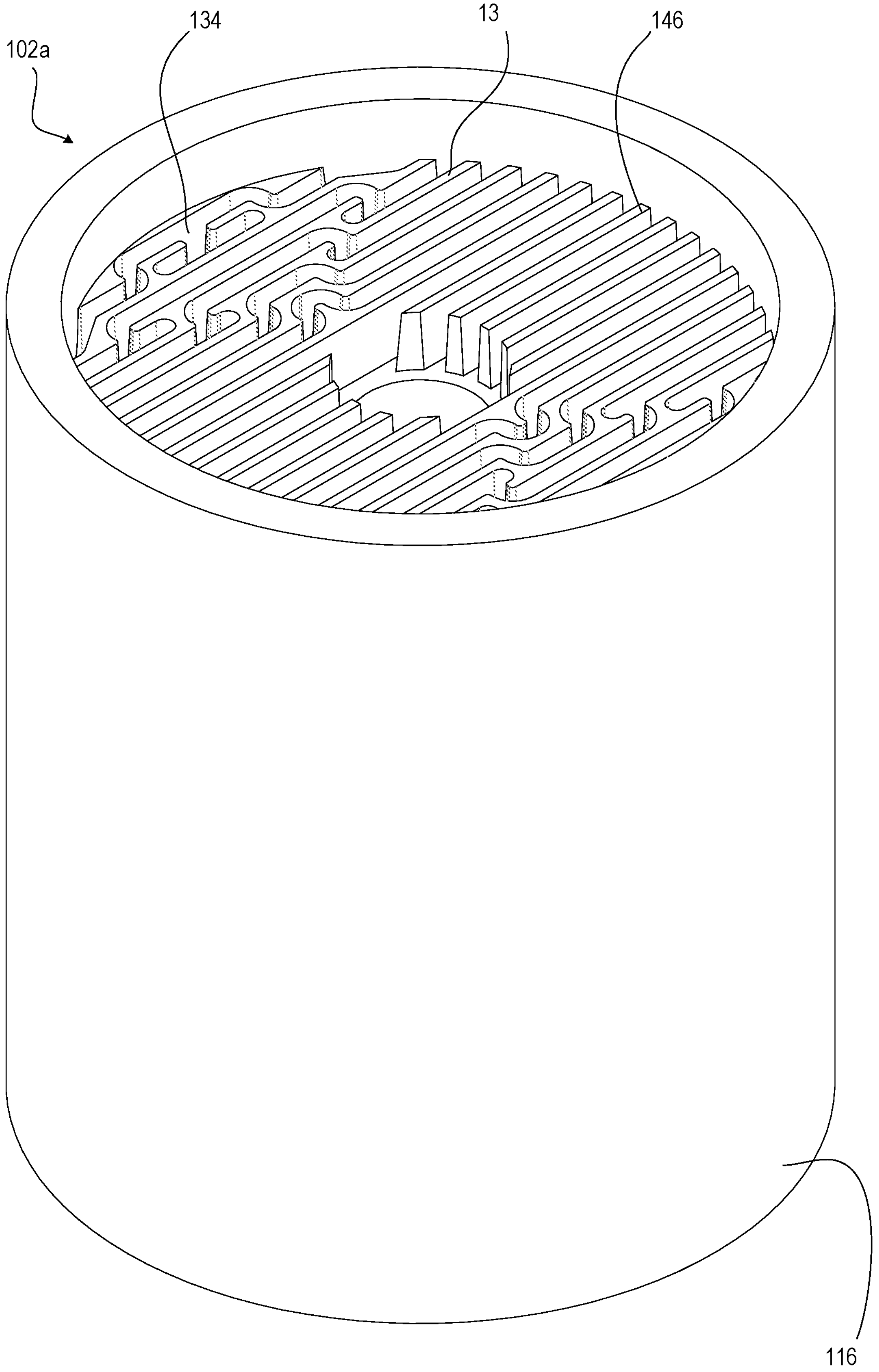
FIG. 10 depicts a three-dimensional bottom view of the cylindrical sidewall enclosure and the cold piston crown of the single piston cylinder assembly of FIG. 4, according to one or more embodiments.

FIG. 10 depicts a three-dimensional top view of the cylindrical 116 that receives the cold head 124 of the single piston cylinder assembly 102*a*.

Figure 11:
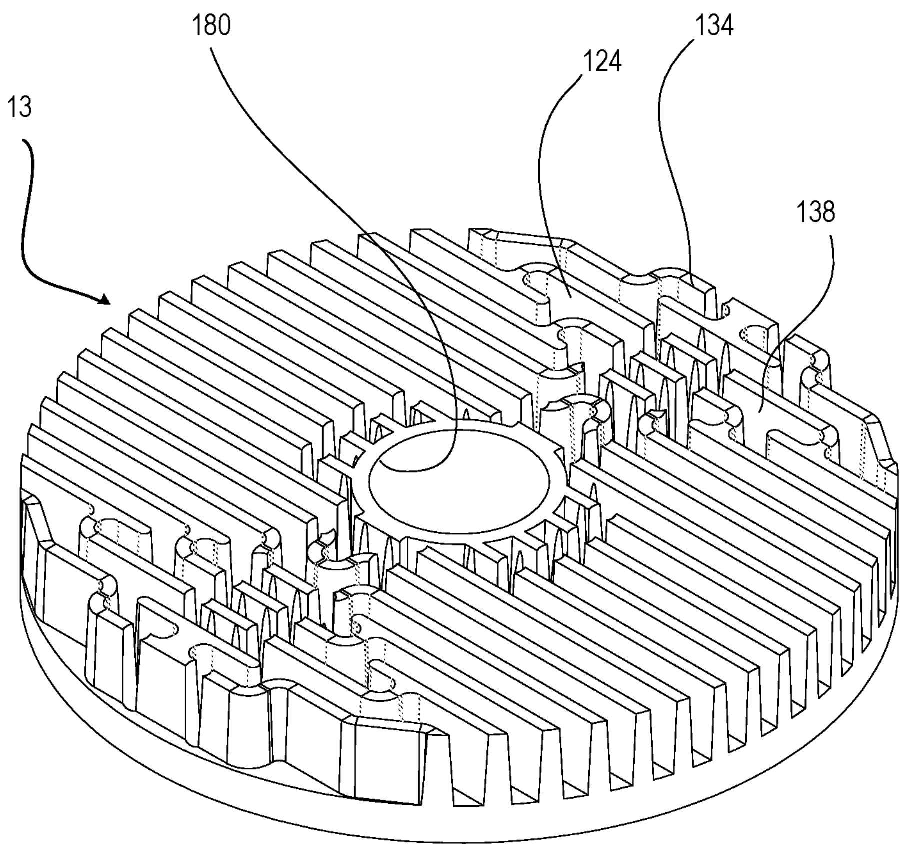
FIG. 11 depicts a three-dimensional bottom view of the cold piston crown of FIG. 10, according to one or more embodiments.

FIG. 11 depicts a three-dimensional top view of the cold piston crown 146. Transverse valleys 134 and transverse peaks 138 on each lateral side of the cold head 124 have a more tortuous path to increase the flow path to approximate the flow path length more closely on the central transverse valleys 134. A central hole 180 in the cold head 124 is for the piston rod 107 (FIG. 1).

Figure 12:
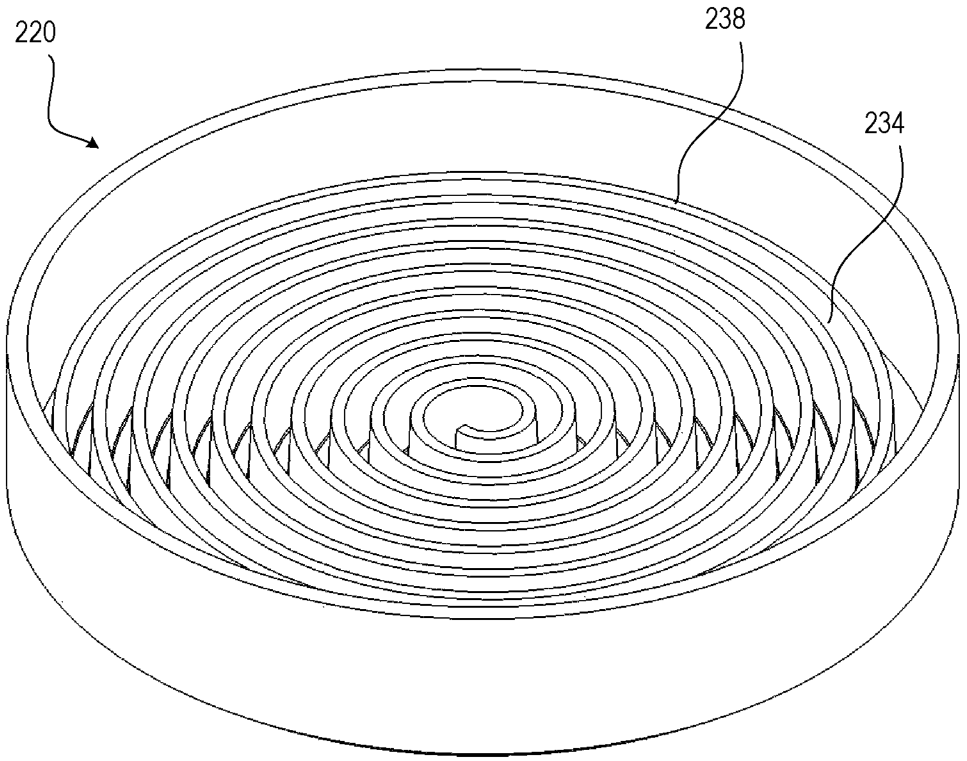
FIG. 12 depicts a three-dimensional top view of the stationary head side of the working space having spiral-shaped fins, according to one or more embodiments.

FIG. 12 depicts a three-dimensional top view of the stationary head side of the working space (either compression space or expansion space) 220. Transverse valleys 234 and transverse peaks 238 on each lateral side of the hot head 220. In one or more embodiment, the stationary head 220 will have holes (not shown) in the transverse valleys 234. In one or more embodiment, the holes will be spaced approximately equidistant from each other to ensure more equal flow from each flow region. In one or more embodiment, the transverse peaks 238 (fins) on this head will have gaps (not shown) placed therein (where the fin portion is not present and is then present again some distance further down the spiral) in some locations to allow working gas to flow to/from the valley of the piston which reciprocates above the fins of the stationary head 220. In one or more embodiment, in these gaps where no fin is present in the spiral, a hole (not shown) will be present to allow working gas to flow to/from the valley of the piston which reciprocates above the fins of the stationary head 220. In one or more embodiment, the stationary head 220 has a central hole (not shown) in the cold head for the piston rod 107 (not shown).

The main advantage of spiraled fins is that the various flow regions are much straighter (have almost no sharp curves that working gas flow must navigate) and exhibit more similar flow and heat transfer properties (when comparing one flow region to another flow region) when designed using a spiral layout.

In one or more embodiments, fins or pins may alternatively be used to increase the interfacial area between the hot fluid combustion products and the solid heater head so as to transfer heat. Additional embodiments of hot and cold heads are disclosed, for example, in U.S. Pat. Nos. 6,381,958, and 6,966,182, which are incorporated by reference in their entireties. Depending on the size of head, hundreds or thousands of inner transfer fins and/or pins and outer heat transfer fins and/or pins may be desirable. One method for manufacturing a head with heat transfer fins/pins includes casting the head and fins/pins (or other protuberances) as an integral unit. Casting methods for fabricating the head and pins as an integral unit include, for example, investment casting, sand casting, or die casting.

In one or more embodiments, castings are made by creating negative forms of the desired part. All forms of production casting (sand, investment, and injection) involves forming extended surfaces and details by injecting material into a mold and then removing the mold from the material leaving the desired negative or positive form behind. Removing the mold from the material requires that all the extended surfaces are at least parallel. In fact, good design practice requires slight draft on these extended surfaces so that they release cleanly. Forming radial pins on the outside or inside of a cylinder would require the molds to contain tens or hundreds of parts that pull apart in different directions. In one or more embodiments, pins or fins may be cast onto the inside and outside surface of Stirling heat exchangers using production sand, investment, or metal injection casting methods. In one or more embodiments, the casting of a head having protuberances, such as pins, extending to the interior and exterior of a part with cylindrical walls may be achieved, in accordance with various embodiments, by investment, or lost-wax, casting, as well as by sand casting, die casting, or other casting processes. The interior or exterior protuberances, or both, may be integrally cast as part of the head.

In order to keep the size of the Stirling cycle engine small, it is important to maximize the heat flux from the combustion gas through the heater head. Whereas prior art employed loops of pipe in which heat transfer to the working fluid is achieved, loops engender both low reliability (since the loops are mechanically vulnerable) and higher cost, due to the more complicated loop geometry and extra materials. The limiting constraint on the heat flux are the thermo-mechanical properties of the heater head material that must be able to withstand the high temperatures of the combustion chamber while maintaining the structural integrity of the pressurized head. The maximum design temperature is determined by the hottest point on the heater head which is typically at the top of the wall. Ideally, the entire heater wall hot section would be at this maximum temperature, as may be controlled, for example, by controlling the fuel flow.

In some embodiments of the Stirling cycle machine, lubricating fluid is used. To prevent the lubricating fluid from escaping the crankcase, a seal is used. In some embodiments, the lubricating fluid is oil. The lubricating fluid is used to lubricate engine parts in a crankcase (not shown), such as hydrodynamic pressure fed lubricated bearings. Lubricating the moving parts of the engine serves to further reduce friction between engine parts and further increase engine efficiency and engine life. In some embodiments, lubricating fluid may be placed at the bottom of the engine, also known as an oil sump, and distributed throughout the crankcase. The lubricating fluid may be distributed to the different parts of the engine by way of a lubricating fluid pump, wherein the lubricating fluid pump may collect lubricating fluid from the sump via a filtered inlet. In the exemplary embodiment, the lubricating fluid is oil and thus, the lubricating fluid pump is herein referred to as an oil pump. However, the term “oil pump” is used only to describe the exemplary embodiment and other embodiments where oil is used as a lubricating fluid, and the term shall not be construed to limit the lubricating fluid or the lubricating fluid pump.

In one or more embodiments, the device of the present invention may also include a lubricating fluid pump in the crankcase. In some embodiments, the lubricating fluid pump is a mechanical lubricating fluid pump driven by a pump drive assembly, the pump drive assembly being connected to and driven by the crankshaft. In some embodiments, the lubricating fluid pump is an electric lubricating fluid pump. The machine may also include a motor connected to the crankshaft. The machine may also include a generator connected to the crankshaft.

In some implementations, the compression ratio discussed above can be increased, for example, by adjusting the shapes of the pistons or the cylinder or both. For example, the volume of the cylinder can be changed. An increased compression ratio increases the adiabatic heating and cooling, and thus decreases the temperature difference across the regenerator, leading to increased efficiency.

As explained above, one characteristic of some Stirling engines is energy loss across the regenerator. Bypass tubes and unidirectional valves can be configured such that the regenerator can be eliminated. Because some energy is lost when the working gas passes through the regenerator, the elimination of the regenerator can reduce the loss of energy. Eliminating the regenerator also eliminates the dead volume associated with the regenerator. In this way, the compression ratios can be adjusted such that the adiabatic heated temperature of the working gas is the same as or higher than the adiabatic cooled temperature of the working gas, thus eliminating the need for a regenerator.

Thermal energy may be provided from various heat sources such as solar radiation or combustion gases. For example, a burner, as previously discussed, may be used to produce hot combustion gases that are used to heat the working fluid. The Stirling engine of the present invention can be utilized as a power-generating device and a power device which makes full use of a heat source such as waste heat and biomass. In another aspect, Aa solar thermal power generation system is provided comprising the Stirling engine assembly described herein for the generation of electrical energy from thermal energy.

In another embodiment, the invention is direct to a method of using a Stirling engine wherein the engine comprises at least one cylinder with at least one regenerator that connects an expansion chamber with a heat exchanger and a compression chamber with a heat sink, wherein a power and a displacement piston move inside the at least one cylinder moving a working medium through the at least one regenerator between the expansion chamber and the compression chamber, wherein the at least one heat exchanger heats the working medium in the expansion chamber, and wherein the at least one heat sink cools the working medium in the compression chamber, characterized in that the engine is connected to a flywheel. In another embodiment, the invention is direct to a method of using at least two Stirling engines, wherein the at least two engines are coupled such that at least one engine functions as thermal prime mover and drives the second, operating inversely as cooling engine or heat pump. In another embodiment, the reversibly operating Stirling is driven by external energy.

It is to be understood that the various heater head embodiments and methods for their manufacture described herein may be adapted to function in a multiple heater head configuration.

It must be noted that, as used in this specification and the appended claims, the singular forms “a,” “an” and “the” include plural referents unless the content clearly dictates otherwise. Thus, for example, reference to a “colorant agent” includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms “comprises,” “comprising,” and other derivatives from the root term “comprise” are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A piston cylinder assembly comprising:

(a) a cylinder comprising an internal bore extending along a longitudinal axis;

(b) a head that caps a first end of the internal bore and that presents an internal surface facing the internal bore, the internal surface comprising:

(i) a plurality of transverse valleys and transverse peaks that extend generally transverse to the longitudinal axis, adjacent transverse valleys being separated by a transverse peak;

(ii) at least one central transverse valley;

(iii) at least one lateral transverse valley that is laterally offset from the at least one central transverse valley; and (iv) a plurality of through holes extending through the head, each of the plurality of through holes opening at the internal surface within a corresponding one of the transverse valleys;

(c) a piston received for longitudinal movement in the internal bore and comprising a piston crown disposed opposite the head, the piston crown presenting transverse peaks and transverse valleys that are complementary to, and longitudinally facing, the transverse valleys and transverse peaks of the head such that adjacent transverse peaks of the piston crown are separated by a respective transverse valley; and (d) a working fluid received in the internal bore between the piston crown and the head;

wherein, on at least one lateral side of the head, the transverse valleys and transverse peaks follow a more tortuous path than the central transverse valley so as to increase a flow path length for the working fluid along the lateral side and to equal a flow path length of the central transverse valley, such that flow path lengths for the working fluid through the central and lateral transverse valleys are more nearly equal during a longitudinal stroke of the piston, thereby providing more nearly uniform residence times and heat transfer characteristics across different flow regions of the head.

2. A heat engine comprising:

(a) a first piston cylinder assembly according to the piston cylinder assembly of claim 1;

(b) a second piston cylinder assembly according to the piston cylinder assembly of claim 1;

(c) a first fluid flow path placing at least one through hole in the head of the first piston cylinder assembly in fluid communication with at least one through hole in the head of the second piston cylinder assembly; and (d) a second fluid flow path placing at least one through hole in the head of the second piston cylinder assembly in fluid communication with at least one through hole in the head of the first piston cylinder assembly;

wherein, during operation, the working fluid reciprocates within each of the first and second piston cylinder assemblies and passes through the respective transverse valleys and transverse peaks and through the through holes in the heads of the first and second piston cylinder assemblies, and wherein the more tortuous transverse valleys on lateral sides of the heads provide more nearly equal flow path lengths and more nearly uniform flow path lengths and heat transfer characteristics across flow regions of each head so as to promote more uniform thermal exchange in the heat engine.

3. The heat engine of claim 2, wherein the first and second piston cylinder assemblies are arranged as a single-action alpha-configuration Stirling engine.

4. The heat engine of claim 2, further comprising, for each piston cylinder assembly, a second head that caps a second end of the internal bore opposite the head, a heater thermally coupled to the head, and a cooler thermally coupled to the second head.

5. A heat engine comprising:

(a) first, second, third, and fourth piston cylinder assemblies, each piston cylinder assembly being the piston cylinder assembly according to claim 1;

(b) a first fluid flow path communicatively coupled between at least one through hole in the head of the first piston cylinder assembly and at least one through hole in the head of the second piston cylinder assembly;

(c) a second fluid flow path communicatively coupled between at least one through hole in the head of the second piston cylinder assembly and at least one through hole in the head of the third piston cylinder assembly;

(d) a third fluid flow path communicatively coupled between at least one through hole in the head of the third piston cylinder assembly and at least one through hole in the head of the fourth piston cylinder assembly; and (e) a fourth fluid flow path communicatively coupled between at least one through hole in the head of the fourth piston cylinder assembly and at least one through hole in the head of the first piston cylinder assembly;

wherein the working fluid reciprocates within each of the first, second, third, and fourth piston cylinder assemblies and passes through the respective transverse valleys and transverse peaks and through the through holes in the heads of the first, second, third, and fourth piston cylinder assemblies, and wherein the more tortuous transverse valleys on lateral sides of the heads provide more nearly equal flow path lengths and more nearly uniform heat transfer characteristics across flow regions of each head so as to promote more uniform thermal exchange and energy conversion in the heat engine.

6. The heat engine of claim 5, wherein the first, second, third, and fourth piston cylinder assemblies are arranged as a double-acting alpha-configuration Stirling engine.

7. The heat engine of claim 5, further comprising, for each piston cylinder assembly, a second head that caps a second end of the internal bore opposite the head, a heater thermally coupled to the head, and a cooler thermally coupled to the second head.

* * * * *